(12) United States Patent
Li (10) Patent No.: US 11,877,253 B2
(45) Date of Patent: Jan. 16, 2024

(54) AIRCRAFT TIME SYNCHRONIZATION SYSTEM AND METHOD

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 17/659,890

(22) Filed: Apr. 20, 2022

(65) Prior Publication Data

US 2022/0248359 A1 Aug. 4, 2022

Related U.S. Application Data

(63) Continuation of application No. PCT/CN2020/122911, filed on Oct. 22, 2020.

(30) Foreign Application Priority Data

Oct. 22, 2019 (CN) .......................... 201911005178.4

(51) Int. Cl.
*H04W 56/00* (2009.01)
*H04J 3/06* (2006.01)
*H04W 4/40* (2018.01)

(52) U.S. Cl.
CPC ....... *H04W 56/0055* (2013.01); *H04J 3/0635* (2013.01); *H04W 4/40* (2018.02)

(58) Field of Classification Search
CPC .... H04W 56/0055; H04W 4/40; H04J 3/0635
See application file for complete search history.

(56) References Cited

U.S. PATENT DOCUMENTS

2004/0083312 A1* 4/2004 Peng ..................... H03M 11/24
710/1
2019/0253169 A1* 8/2019 Ha ..................... H04W 56/002

FOREIGN PATENT DOCUMENTS

CN 108768576 A 11/2018
CN 208596378 U 3/2019
(Continued)

OTHER PUBLICATIONS

PCT International Search Report for PCT/CN2020/122911 dated Jan. 20, 2021 with English translation.

*Primary Examiner* — Samina F Choudhry (57) ABSTRACT

The embodiments are an aircraft time synchronization system and method. The system comprises: a first communication module and a second communication module, wherein data transmission is performed between the first communication module and the second communication module via a communication line, and an I/O interface of the first communication module is connected to the I/O interface of the second communication module via an interruption signal line; the first communication module sends the data information to the second communication module via the communication line, and at the same time sends the triggered interruption signal to the second communication module via the interruption signal line; the second communication module performs time synchronization with the first communication module based on the communication time difference and system time difference with the first communication module determined according to the receiving time of the data information and interruption signal and the sending time.

10 Claims, 3 Drawing Sheets

(56) References Cited

FOREIGN PATENT DOCUMENTS

| | | | |
|---|---|---|---|
| CN | 109983414 | A | 7/2019 |
| CN | 110329273 | A | 10/2019 |
| CN | 110636603 | A | 12/2019 |
| CN | 112119365 | A | 12/2020 |
| KR | 100190856 | B1 * | 6/1999 |

* cited by examiner

AIRCRAFT TIME SYNCHRONIZATION SYSTEM AND METHOD

CROSS REFERENCE

The present application is a continuation of International Application No. PCT/CN2020/122911, filed on Oct. 22, 2020, which claims priority to Chinese patent application No. 201911005178.4, filed on Oct. 22, 2019, which is incorporated herein by reference in its entirety.

BACKGROUND

Technical Field

Embodiments of the present invention relate to the technical field of aircraft, and more particularly to an aircraft time synchronization system and method.

Related Art

With the development of science and technology, the application range of aircraft is more and more extensive, ranging from military use at the national level to recreational use at the individual level. For example, the aircraft may be an unmanned aerial vehicle. Generally, an aircraft comprises multiple devices for acquiring information such as the current pose information of the aircraft and images of the environment of the aircraft. After communication is performed between these devices, a motion control command is generated to control the subsequent motion state of the aircraft.

Since these devices may be distributed in different operating systems, there may be a system time difference in the scheduling itself. Moreover, there exists a communication delay between the devices, which may result in the data information being sent and received out of synchronization, thereby resulting in the inability to accurately obtain the current state of the aircraft and control the accurate motion of the aircraft.

SUMMARY

Embodiments of the present invention provide an aircraft time synchronization system and method that can accurately achieve aircraft time synchronization and accurately control the aircraft motion.

In a first aspect, an embodiment of the present invention provides an aircraft time synchronization system, the system comprising a first communication module and a second communication module. Data transmission between the first communication module and the second communication module is realized via a communication line, and an I/O interface of the first communication module is connected to an I/O interface of the second communication module via an interruption signal line;

the first communication module sends data information to the second communication module via the communication line, and at the same time sends a triggered interruption signal to the second communication module via the interruption signal line; wherein the data information contains a sending time when the data information is sent and the interruption signal is triggered;

the second communication module determines a communication time difference and a system time difference with the first communication module according to the receiving time of the data information and the interruption signal, and the sending time, and performs time synchronization with the first communication module according to the communication time difference and the system time difference.

In a second aspect, an embodiment of the present invention also provides an aircraft time synchronization method applied to the second communication module in the aircraft time synchronization system of any embodiment of the present invention, the method comprising:

receiving data information and the interruption signal sent by the first communication module; wherein the first communication module sends the data information to the second communication module via a communication line, and at the same time sends the triggered interruption signal to the second communication module via the interruption signal line, and the data information contains a sending time when the data information is sent and the interruption signal is triggered;

and determining the communication time difference and system time difference with the first communication module according to the receiving time of the data information and the interruption signal, and the sending time; and performing time synchronization with the first communication module according to the communication time difference and the system time difference.

According to the technical solution of the embodiments of the present invention, by setting the interruption signal line between the first communication module and the second communication module, determining the system time difference between the second communication module and the first communication module, and further, with the time of the data information and the interruption signal being received by the second communication module, the communication time difference for data transmission by two communication modules can be accurately obtained; according to the system time difference and the communication time difference, accurate time synchronization between different communication modules of the aircraft is realized, thereby accurately controlling the aircraft motion.

DETAILED DESCRIPTION

The present invention will now be described in further detail with reference to the accompanying drawings and embodiments. It should be understood that the particular embodiments described herein are illustrative only and are not restrictive. It should also be noted that, for ease of description, only some, but not all, of the structures associated with the present invention are shown in the drawings.

Embodiment 1

Figure 1:
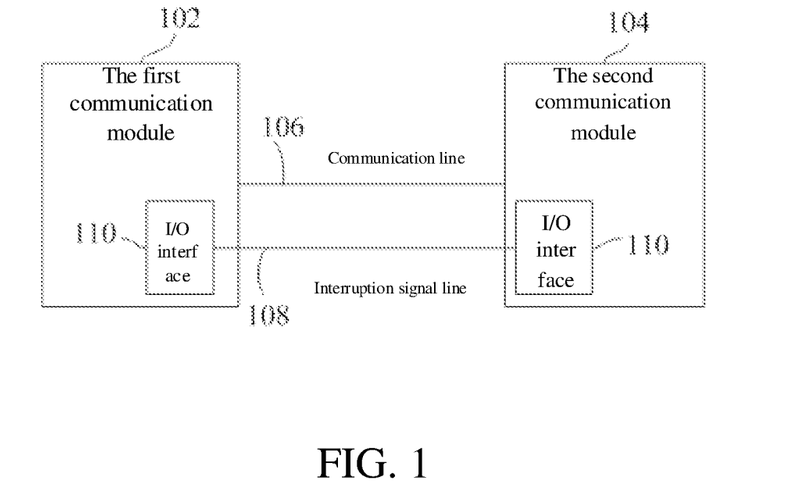
FIG. 1 is a schematic view of an aircraft time synchronization system according to embodiment 1 of the present invention.

FIG. 1 is a schematic view of an aircraft time synchronization system according to embodiment 1 of the present invention. This embodiment can be applied to the case of performing time synchronization on different communication modules in the aircraft. The system specifically comprises:

a first communication module 102 and a second communication module 104, wherein the data transmission is performed between the first communication module 102 and the second communication module 104 via a communication line 106, and an I/O interface 110 of the first communication module 102 is connected to the I/O interface 110 of the second communication module 104 via an interruption signal line 108.

The first communication module 102 and the second communication module 104 are two different communication modules in the same aircraft, and the first communication module 102 and the second communication module 104 can be distributed in different operating systems. Therefore, there may be a system time difference in scheduling between different operating systems, and there may be a communication delay when the first communication module 102 and the second communication module 104 perform data transmission, and the second communication module 104 and the first communication module 102 need to perform time synchronization so as to accurately control the motion of the aircraft.

Alternatively, the first communication module 102 sends the data information to the second communication module 104 via the communication line 106, and at the same time sends the triggered interruption signal to the second communication module 104 via the interruption signal line 108; the data information contains the sending time when sending the data information and triggering the interruption signal.

Specifically, an I/O interface is provided on both the first communication module 102 and the second communication module 104, and the I/O interface 110 of the first communication module 102 is connected to the I/O interface 110 of the second communication module 104 via the interruption signal line 108. The interruption signal line 108 is used to transmit an interruption signal. The interruption signal is a level variation signal, which may be changed from a high level to a low level or from a low level to a high level. Since the interruption signal only represents the variation of high level and low level, after the trigger end triggers the interruption signal, the interruption signal line 108 transmits the interruption signal to the receiving end, and the receiving end will respond immediately without delay in the transmission of the interruption signal. The interruption signal line 108 may be a General-purpose input/output (GPIO) line.

The data transmission between the first communication module 102 and the second communication module 104 via the communication line 106 can be wireless data transmission via Bluetooth or WiFi, etc., or wired data transmission via a serial port line or USB, etc.

The first communication module 102 triggers the interruption signal while sending the data information to the second communication module 104 via the communication line 106, and sends the interruption signal to the second communication module 104 via the interruption signal line 108, namely, the moment when the first communication module 102 sends the data information is the same moment as the moment when the interruption signal is triggered, and this moment is denoted as the sending time. Furthermore, the data information sent by the first communication module 102 to the second communication module 104 contains sending time information so that the second communication module 104 knows the sending time of the first communication module 102.

Alternatively, the second communication module 104 determines the communication time difference and the system time difference with the first communication module 102 according to the receiving time of the data information and the interruption signal and sending time, and performs time synchronization with the first communication module 102 according to the communication time difference and the system time difference.

Specifically, after the first communication module 102 triggers the interruption signal, the second communication module 104 will respond immediately; there is no delay in sending and receiving the interruption signal between the first communication module 102 and the second communication module 104, while there is a communication delay in sending and receiving the data information between the first communication module 102 and the second communication module 104; therefore, the second communication module 104 first receives the interruption signal, and can record the moment when the interruption signal is received as an interruption receiving time, and then receives the data information, and can record the time when the data information is received as the data receiving time.

If the interruption receiving time is the same as the sending time, it indicates that there is no system time difference between the first communication module 102 and the second communication module 104. Otherwise, there is a system time difference which is the absolute value of the difference value between the interruption receiving time and the sending time.

Since the transceiving of the interruption signal between the first communication module 102 and the second communication module 104 has no delay, the communication time difference between the first communication module 102 and the second communication module 104 is the time difference of the data receiving time and the interruption receiving time.

The second communication module 104 performs time synchronization with the first communication module 102 according to the calculated communication time difference and the system time difference. Alternatively, the data receiving time may be synchronized to sending time.

Alternatively, since the first communication module 102 may send thousands of data information to the second communication module 104 every second, in order to save system resources and ensure the accuracy of the time synchronization between the communication modules, a period during which the first communication module 102 triggers the interruption signal can be preset; the second communication module 104 recalculates the system time difference and the communication time difference according to the periodically received interruption signal, and performs time synchronization with the first communication module 102 according to the new system time difference and the communication time difference.

Specifically, the period for the first communication module 102 to trigger the interruption signal can be preset to be 2 seconds. Namely, every 2 seconds, the second communication module 104 recalculates the system time difference and communication time difference with the first communication module 102 according to the time when the interruption signal and data information are received, and performs time synchronization with the first communication module 102 according to the new system time difference and communication time difference.

According to the technical solution of the embodiments of the present invention, by setting the interruption signal line between the first communication module and the second communication module, determining the system time difference between the second communication module and the first communication module, and further with the time of the data information and the interruption signal being received by the second communication module, the communication time difference for data transmission by two communication modules can be accurately obtained; according to the system time difference and the communication time difference, accurate time synchronization between different communication modules of the aircraft is realized, thereby accurately controlling the aircraft motion.

Embodiment 2

Figure 2A:
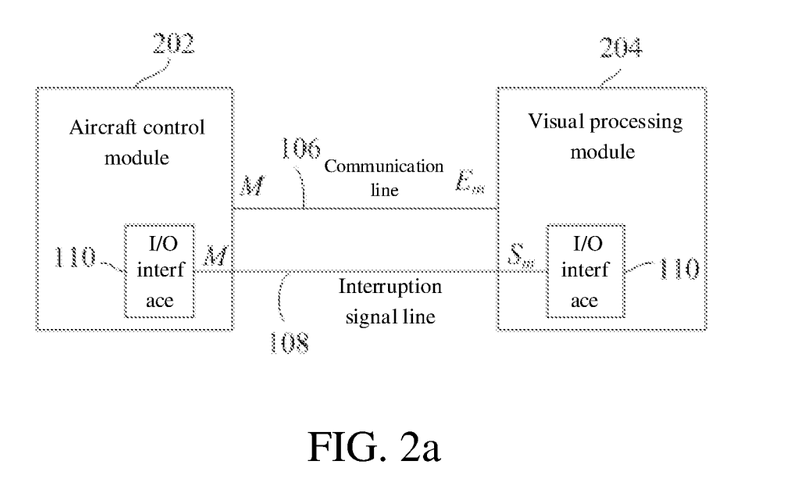
FIG. 2a is a schematic view of an aircraft time synchronization system according to embodiment 2 of the present invention.

FIG. 2a is a schematic view of an aircraft time synchronization system according to embodiment 2 of the present invention. As shown in FIG. 2a, it is described by way of a specific example.

Alternatively, the aircraft may include an aircraft control module 202 and a visual processing module 204. The data transmission is performed between the aircraft control module 202 and the visual processing module 204 via the communication line 106, and the I/O interface 110 of the aircraft control module 202 is connected to the I/O interface 110 of the visual processing module 204 via the interruption signal line 108.

Specifically, the first communication module 102 can be an aircraft control module 202, and the second communication module 104 can be a visual processing module 204; the aircraft control module 202 can send the collected position and posture information about the aircraft, namely, the position and orientation information, to the visual processing module 204 via the communication line 106 for visual processing so as to display a pose image of the current aircraft. While sending the position and orientation information to the visual processing module 204, the aircraft control module 202 triggers the interruption signal to be sent by the interruption signal line 108 to the visual processing module 204. The position and orientation information contains the sending time when the aircraft control module 202 sends the position and orientation information and triggers the interruption signal.

The visual processing module 204 determines the communication time difference and system time difference with the aircraft control module 202 according to the receiving time the of position and orientation information and the interruption signal, and the sending time of the aircraft control module 202, and performs time synchronization with the aircraft control module 202 according to the communication time difference and the system time difference.

Illustratively, the interruption receiving time when the visual processing module 204 receives the interruption signal is $S_m$, the position and orientation receiving time when the position and orientation information is received is $E_m$, and then the system time difference between the aircraft control module 202 and the visual processing module 204 is:

$$\Delta T_m = |S_m - M|$$

where M is the sending time when the aircraft control module 202 sends the position and orientation information and triggers the interruption signal.

The communication time difference is:

$$T_m = E_m - S_m$$

when the aircraft control module 202 communicates with the visual processing module 204, the visual processing module 204 performs time synchronization with the aircraft control module 202 according to the calculated communication time difference $T_m$ and system time difference $\Delta T_m$, namely, the position and orientation receiving time of the visual processing module 204 is synchronized to the sending time.

Based on the above-mentioned embodiment, it can be preset that the same calculation mode as in the above embodiment is adopted every 2 seconds, and recalculation is performed to obtain the new communication time difference $T'_m$ and the system time difference $\Delta T'_m$, and the time synchronization between the visual processing module 204 and the aircraft control module 202 is realized according to the new $T'_m$ and $\Delta T'_m$.

Figure 2B:
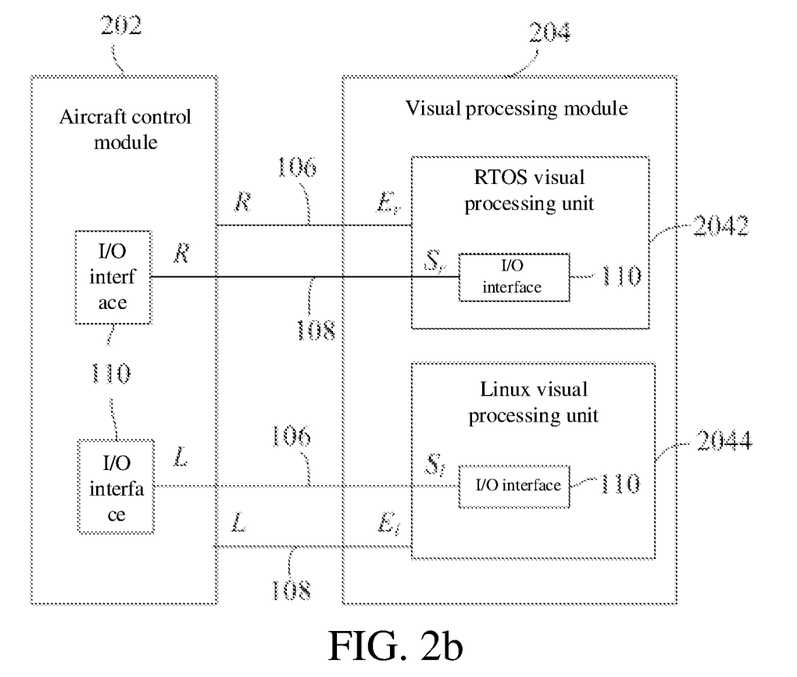
FIG. 2b is a schematic view of an aircraft time synchronization system according to embodiment 2 of the present invention.

Further, the visual processing module may comprise RTOS visual processing unit and Linux visual processing unit, as shown in FIG. 2b. FIG. 2b is a schematic view of an aircraft time synchronization system provided in embodiment 2 of the present invention.

Specifically, the RTOS visual processing unit 2042 is a visual processing unit distributed in the RTOS operating system, and the RTOS visual processing unit 2042 has a fast response and can calculate the distance information to surrounding obstacles in real time; the Linux visual processing unit 2044 is a visual processing unit distributed in the Linux system with slow response and low power consumption, and is mainly used for three-dimensional mapping of the current position and posture of the aircraft. An I/O interface is provided in the RTOS visual processing unit 2042 and the Linux visual processing unit 2044, respectively. Alternatively, the number of the I/O interfaces in the aircraft control module 202 corresponds to the sum of the number of I/O interfaces in each visual processing unit in the visual processing module 204. Each I/O interface in the aircraft control module 202 is connected to a corresponding I/O interface in each visual processing unit in the visual processing module 204 via the interruption signal line 108, and each visual processing unit in the aircraft control module 202 and the visual processing module 204 transmits data via a corresponding communication line 106, wherein the communication line 106 corresponds to the interruption signal line 108.

The aircraft control module 202 sends the same position and orientation information to the RTOS visual processing unit 2042 and the Linux visual processing unit 2044 in the visual processing module 204 respectively via the corresponding communication line 108. At the same time as sending the position and orientation information, the interruption signal is triggered, and the corresponding interruption signal line 106 sends the interruption signal to the corresponding visual processing unit.

Based on the above-mentioned embodiments, taking the RTOS visual processing unit 2042 as an example for explanation, and assuming that the interruption receiving time when the RTOS visual processing unit 2042 receives the interruption signal is $S_r$ and the position and orientation receiving time when the position and orientation information is received is $E_r$, then the system time difference between the aircraft control module 202 and the RTOS visual processing unit 2042 is:

$$\Delta T_r = |S_r - R|$$

where R is the sending time when the aircraft control module 202 sends the position and orientation information to the RTOS visual processing unit 2042 and triggers the interruption signal.

The communication time difference is:

$$T_r = E_r - S_r$$

Then, when the aircraft control module 202 communicates with the RTOS visual processing unit 2042, the RTOS visual processing unit 2042 performs time synchronization with the aircraft control module 202 according to the calculated communication time difference $T_r$ and system time difference $\Delta T_r$.

Similarly, the time synchronization of Linux visual processing unit 2044 and aircraft control module 202 is realized according to the calculation mode of the communication time difference and the system time difference described in the above embodiment. Assuming that the interruption receiving time when the Linux visual processing unit 2044 receives the interruption signal is $S_l$, and the position and orientation receiving time when the position and orientation information is received is $E_l$, then the system time difference between the aircraft control module 202 and the Linux visual processing unit 2044 is:

$$\Delta T_l = |S_l - L|$$

where R is the sending time when the aircraft control module 202 sends the position and orientation information to the Linux visual processing unit 2044 and the triggers interruption signal.

The communication time difference is:

$$T_l = E_l - S_l$$

Then, when the aircraft control module 202 communicates with the Linux visual processing unit 2044, the Linux visual processing unit 2044 performs time synchronization with the aircraft control module 202 according to the calculated communication time difference $T_l$ and system time difference $\Delta T_l$.

Figure 2C:
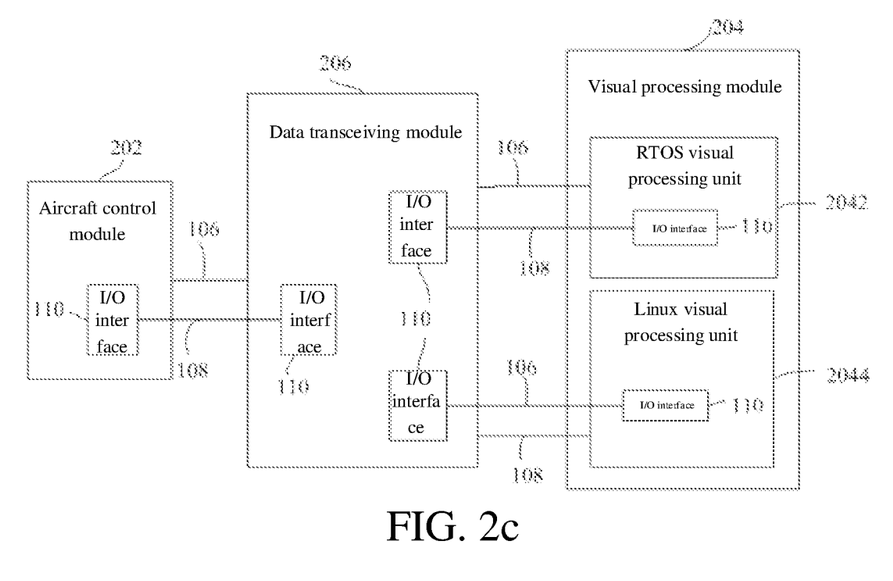
FIG. 2c is a schematic view of an aircraft time synchronization system according to embodiment 2 of the present invention.

Furthermore, in order to enhance the stability of data transceiving between the aircraft control module 202 and the visual processing module 204 and reduce data fluctuation, a data transceiving module 206 can be added between the aircraft control module 202 and the visual processing module 204, and data information transmission between the aircraft control module 202 and the visual processing module 204 can be performed via the data transceiving module 206. As shown in FIG. 2c, there is shown a schematic view of an aircraft time synchronization system provided in embodiment 2 of the present invention.

Specifically, the number of I/O interfaces set in the data transceiving module 206 coincides with the sum of the I/O interfaces in the aircraft control module 202 and the visual processing module 204. Each I/O interface of the data transceiving module 206 is connected to an I/O interface corresponding to each visual processing unit in the aircraft control module 202 and the visual processing module 204 via the interruption signal line 108; the data transceiving module 206 performs data transmission with each visual processing unit in the aircraft control module 202 and the visual processing module 204 respectively via the communication line 106; the communication line 106 corresponds to the interruption signal line 108.

Based on the calculation modes of the communication time difference and the system time difference introduced in the above-mentioned embodiments, the communication time differences and system time differences between the data transceiving module 206 and the aircraft control module 202, the data transceiving module 206 and the RTOS visual processing unit 2042, and the data transceiving module 206 and the Linux visual processing unit 2044 are respectively obtained. According to each communication time difference and system time difference, the aircraft control module 202, the RTOS visual processing unit 2042 and the Linux visual processing unit 2044 are all subjected to time synchronization with the data transceiving module 206. When the aircraft control module 202, the RTOS visual processing unit 2042, and the Linux visual processing unit 2044 all realize time synchronization with the data transceiving module 206, the aircraft control module 202 also realizes time synchronization with the RTOS visual processing unit 2042 and the Linux visual processing unit 2044.

The embodiment of the present invention determines the system time difference of each communication module by setting an interruption signal line between each communication module, and further, with the time when the data information and interruption signal are received, accurately obtains the communication time difference for data transmission by each communication module, and according to the system time difference and the communication time difference, achieves the accurate time synchronization between different communication modules of the aircraft, thereby accurately controlling the aircraft motion.

Embodiment 3

Figure 3:
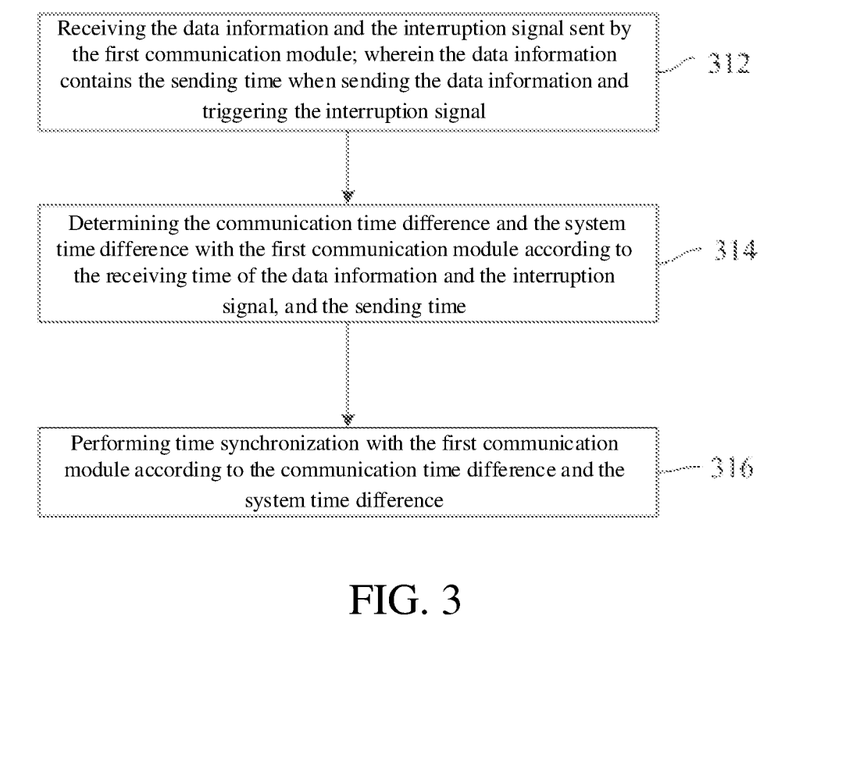
FIG. 3 is a flowchart of an aircraft time synchronization method according to embodiment 3 of the present invention.

FIG. 3 is a flowchart of an aircraft time synchronization method in embodiment 3 of the present invention. The method can be executed based on the aircraft time synchronization system provided in the above-mentioned embodiments. As shown in FIG. 3, the aircraft time synchronization method comprises:

step 312, receiving the data information and the interruption signal sent by the first communication module; wherein, the data information contains the sending time when sending the data information and triggering the interruption signal.

Alternatively, the first communication module sends the data information to the second communication module via the communication line, while the triggered interruption signal is sent to the second communication module via the interruption signal line.

Alternatively, data transmission is performed between the first communication module and the second communication module via the communication line, and the I/O interface of the first communication module is connected to the I/O interface of the second communication module via the interruption signal line.

Wherein the interruption signal is a level variation signal, including changing from high level to low level or from low level to high level. The interruption signal line includes a GPIO line; the communication line includes Bluetooth, WiFi, serial port line, or USB.

Step 314, determining the communication time difference and system time difference of the first communication module according to the receiving time of the data information and interruption signal and sending time.

Alternatively, the communication time difference can be determined according to the receiving time of the interruption signal and the receiving time of the data information; the system time difference is determined according to the receiving time of the sending time and interruption signal.

Alternatively, the first communication module periodically sends the interruption signal, and the second communication module performs time synchronization with the first communication module according to the periodically sent interruption signal.

Step 316, performing time synchronization with the first communication module according to the communication time difference and system time difference.

The above-mentioned method can be executed by the aircraft time synchronization system provided by any embodiment of the present invention, with the corresponding advantageous effects of the system.

It is noted that the foregoing are only preferred embodiments of the present invention and the technical principles applied thereto. It will be understood by those skilled in the art that the present invention is not limited to the particular embodiments described herein, and that various obvious changes, rearrangements and substitutions can be made by those skilled in the art without departing from the scope of the present invention. Therefore, although the present invention has been described in detail through the above embodiments, the present invention is not limited to the above embodiments, and can also include more other equivalent embodiments without departing from the concept of the present invention. The scope of the present invention is determined by the scope of the appended claims.

The invention claimed is:

1. An aircraft time synchronization system, wherein the system comprising:
    a first communication module, sending a data information and a triggered interruption signal;
    a second communication module, receiving the data information and the triggered interruption signal;
    a communication line, performing data transmission between the first communication module and the second communication module;
    an I/O interface of the first communication module is connected to the I/O interface of the second communication module via an interruption signal line;
    the first communication module sends data information to the second communication module via the communication line, and at the same time sends a triggered interruption signal to the second communication module via the interruption signal line; wherein the data information contains a sending time when the data information is sent and the interruption signal is triggered;
    the second communication module determines a communication time difference and a system time difference with the first communication module according to receiving time of the data information and the interruption signal, and the sending time, and performs time synchronization with the first communication module according to the communication time difference and the system time difference;
    the communication time difference is a time difference between the receiving time of the data information received by the second communication module and the receiving time of the interruption signal received by the second communication module; and
    the system time difference is a time difference between the receiving time of the interruption signal received by the second communication module and the sending time of the interruption signal sent by the first communication module.

2. The aircraft time synchronization system according to claim 1, wherein the second communication module is specifically used for determining the communication time difference according to the receiving time of the interruption signal and the receiving time of the data information; and determining the system time difference according to the sending time and the receiving time of the interruption signal.

3. The aircraft time synchronization system according to claim 1, wherein the interruption signal is sent periodically, and the second communication module performs time synchronization with the first communication module according to periodically sent interruption signal.

4. The aircraft time synchronization system according to claim 1, wherein the interruption signal is a level variation signal, comprising changing from high level to low level or from low level to high level.

5. The aircraft time synchronization system according to claim 1, wherein the interruption signal line comprises a GPIO line.

6. The system according to claim 1, wherein the communication line comprises Bluetooth, WiFi, serial port line, or USB.

7. An aircraft time synchronization system comprising:
    a first communication module, sending a data information and a triggered interruption signal;
    a second communication module, receiving the data information and the triggered interruption signal;
    the second communication module communicatively connected to the first communication module via a communication line, and an I/O interface of the first communication module is connected to the I/O interface of the second communication module via an interruption signal line;
    one or more processors; and
    a memory communicatively connected to the one or more processors, configured to store one or more programs;
    the one or more programs, when executed by the one or more processors, causing the one or more processors to:
    receive data information and the interruption signal sent by the first communication module; wherein the first communication module sends the data information to the second communication module via a communication line, and at the same time sends a triggered interruption signal to the second communication module via the interruption signal line, and the data information contains a sending time when the data information is sent and the interruption signal is triggered;
    determine communication time difference and system time difference with the first communication module according to the receiving time of the data information and the interruption signal, and the sending time;
    performing time synchronization with the first communication module according to the communication time difference and the system time difference;
    the communication time difference is a time difference between the receiving time of the data information received by the second communication module and the receiving time of the interruption signal received by the second communication module; and
    the system time difference is a time difference between the receiving time of the interruption signal received by the second communication module and the sending time of the interruption signal sent by the first communication module.

8. The non-transitory computer-readable storage medium according to claim 7, wherein the one or more processors is further configured to:

determine the communication time difference according to the receiving time of the interruption signal and the receiving time of the data information;

and determine the system time difference according to the sending time, and the receiving time of the interruption signal.

9. The non-transitory computer-readable storage medium according to claim 8, wherein the interruption signal is sent periodically, and the second communication module performs time synchronization with the first communication module according to periodically sent interruption signal.

10. The non-transitory computer-readable storage medium according to claim 7, wherein the interruption signal is a level variation signal, comprising changing from high level to low level or from low level to high level, and is transmitted via an interruption signal line set between a first communication unit and a second communication unit;

wherein the interruption signal line comprises a GPIO line.

* * * * *